United States Patent
Morrison

[11] 3,913,166
[45] Oct. 21, 1975

[54] HEADLIGHT CLEANING ATTACHMENT

[75] Inventor: James J. Morrison, Windsor, Canada

[73] Assignee: Kasle Steel Corporation, Detroit, Mich.

[22] Filed: Apr. 17, 1974

[21] Appl. No.: 461,525

[52] U.S. Cl. ........ 15/250.01; 15/250.27; 15/250.29; 15/250 A
[51] Int. Cl.² ...... B60S 1/20; B60S 1/44; B60S 1/46
[58] Field of Search....... 15/250.01, 250.04, 250.24, 15/250.25, 250.26, 250.27, 250.29, 250 A

[56] References Cited
UNITED STATES PATENTS

| | | | |
|---|---|---|---|
| 3,289,237 | 12/1966 | Lindsey | 15/250 A |
| 3,667,081 | 6/1972 | Burger | 15/250.24 |
| 3,775,803 | 12/1973 | Brumm et al. | 15/250.29 |
| 3,795,936 | 3/1974 | Lane et al. | 15/250.27 |
| 3,835,499 | 9/1974 | Bender | 15/250.04 |
| 3,855,662 | 12/1974 | Fortin | 15/250.29 |

FOREIGN PATENTS OR APPLICATIONS 1,545,841  10/1968  France.......................... 15/250 A Primary Examiner—Peter Feldman
Attorney, Agent, or Firm—Cullen, Settle, Sloman & Cantor

[57] ABSTRACT

An attachment for automobiles which replaces the conventional curved headlamp surface with an easily cleanable flat surface. The attachment includes a frame to support a clear transparent member which provides a flat surface, and the frame is sealed against the auto to prevent dirt and moisture from collecting on the curved lamp surface. A wiper blade unit, mounted on rollers in the frame, is moved across the transparent member to clean the flat surface. The wiper may be actuated in one of several ways including a direct cable or a mechanical linkage, and water may be directed onto the flat surface for improved cleaning.

5 Claims, 3 Drawing Figures

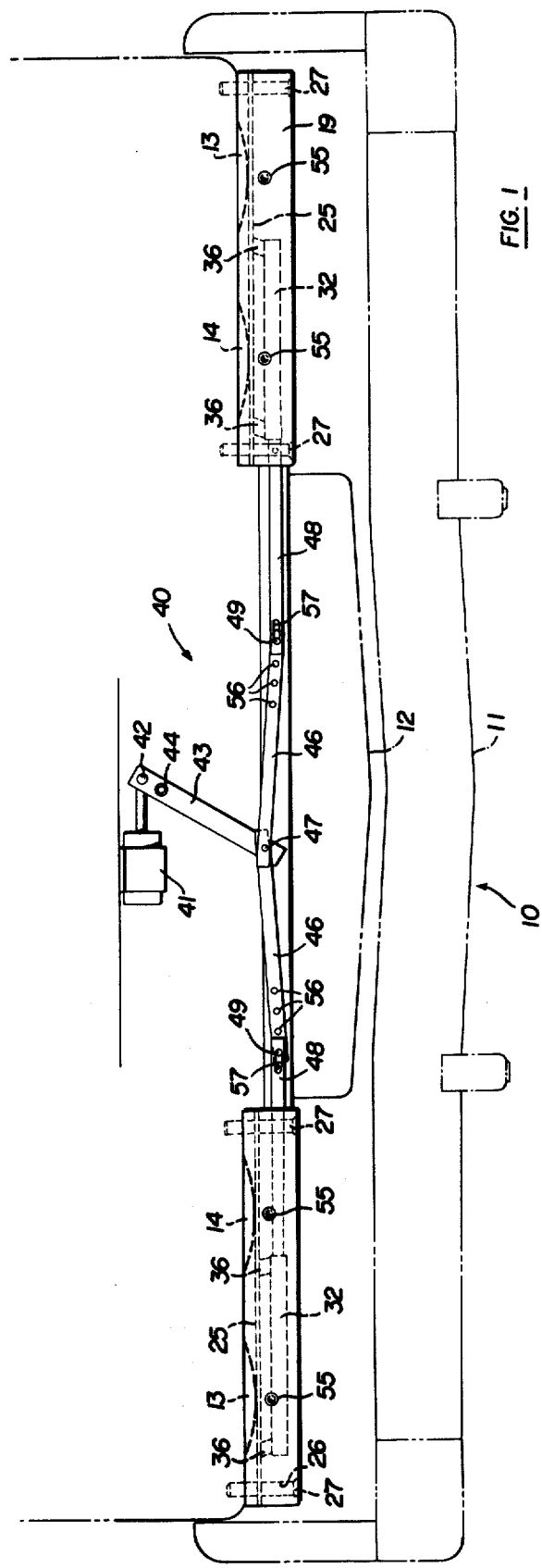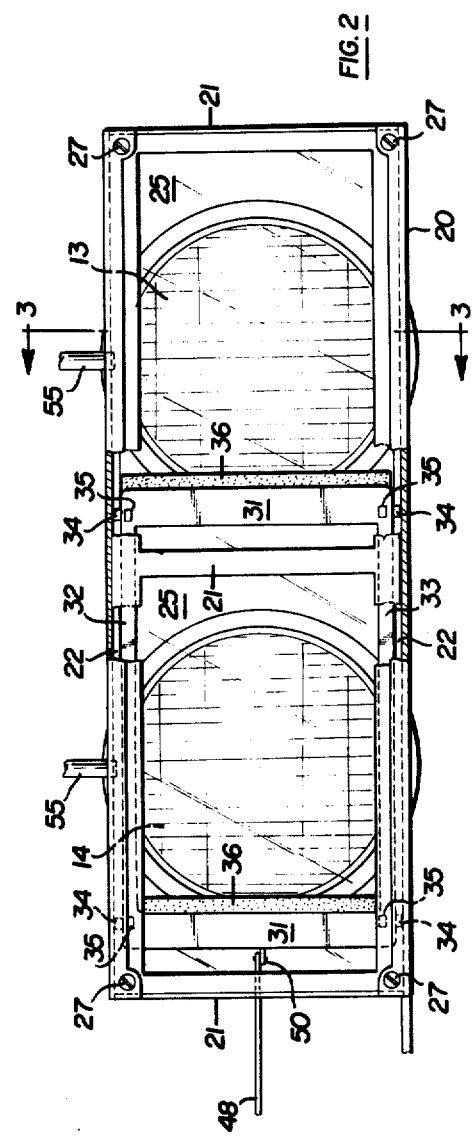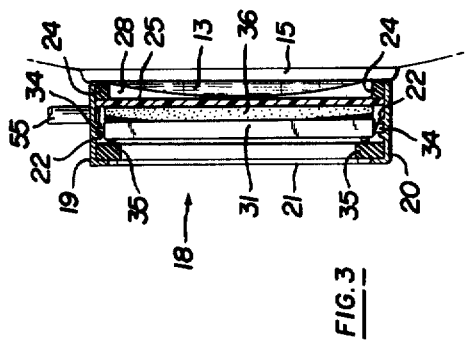

HEADLIGHT CLEANING ATTACHMENT

BACKGROUND OF THE INVENTION

The invention herein relates to an apparatus for cleaning the headlights of a vehicle such as an automobile. Automobile headlights are typically positioned in pairs, one pair on each side of the center of the automobile usually close to the side edge of the automobile. Within each pair of headlights or headlamps there is typically a low beam, for normal night time driving, and a high beam to illuminate a greater distance down the roadway.

All operators of automobiles are aware of the great restriction in illumination caused by the headlights becoming dirty. The headlights may become dirty in any one of a number of ways including rain or snow, moisture on the roadway thrown up into the headlights from the wheels of another vehicle, and a collection of dead insects caused by the speed of the vehicle coming into contact with various flying insects.

Heretofore, while it has been suggested to use a water spray on the headlamps, there has been no satisfactory apparatus for cleaning the headlamps.

I have discovered that the crux of the problem is that the surface of a sealed beam headlamp can not be cleaned satisfactorily by known techniques because of the curvature of the surface.

Thus the invention herein relates to an apparatus for cleaning the headlamp, by providing an auxiliary flat, easily cleanable surface. The apparatus may be conveniently installed by the owner of the vehicle, conveniently installed as an option by the dealer selling the vehicle, or easily installed at the factory where the automobile is initially manufactured.

Furthermore, the present invention can be easily removed when it becomes necessary to replace any one of the headlamps.

SUMMARY OF THE INVENTION

The invention herein relates to an apparatus for cleaning headlamps by providing an easily cleanable flat surface, including a frame which spans a pair of headlamps, a clear transparent material, which provides a flat surface, such as plastic or plexiglass positioned within the frame, and a weather-stripping to form a tight seal between the frame and the plexiglass and the headlamps of the automobile. The frame includes a first portion to support the plexiglass and a channel in which there is mounted a moveable frame having wiper blades thereon. The movable frame is suitably mounted on rollers and is moved across the flat surface a distance just slightly in excess of the width of a single headlamp. During this movement, in a single direction, each wiper blade cleans the flat surface of the plexiglass in front of one headlamp.

Since a tight seal is formed between the headlamp and the plexiglass, no dirt can collect on the headlamp itself. Thus the plexiglass is actually an auxiliary surface to be cleansed by the wiper blades of the moveable frame.

An apparatus is provided for moving the movable frame including a source of power which pivots a first rod, and a multiple rod linkage which translates the pivotal motion of the first rod into lateral movement of the movable frame across the flat surface.

BRIEF DESCRIPTION OF THE DRAWINGS

The various objects and advantages of the present invention will be more completely understood upon reading the following detailed description taken in conjunction with the drawings.

In the drawings, wherein like reference numerals identify corresponding parts:

FIG. 1 is a partial top view of the front end of an automobile illustrating the present invention;

FIG. 2 is an enlarged illustration of a single pair of headlamps and the headlamp cleaning apparatus of the present invention; and FIG. 3 is an enlarged view of the headlamp and frame of FIG. 2 as seen in the plane of the arrows 3—3 of FIG. 2.

DETAILED DESCRIPTION OF THE INVENTION

As shown in the drawings, the front end of an automobile 10 is illustrated including a conventional bumper 11 and a radiator 12. There are also shown the two pairs of headlights each including the low beams 13 and the high beams 14 surrounded by chrome 15 (FIG. 3).

The headlamp cleaners of the present invention, as illustrated in greater detail in FIGS. 2 and 3, include a first elongated rectangular frame 18, manufactured of metal, plastic or the like, having top and bottom frame members 19 and 20, respectively, and vertical members 21. Within the frame top and bottom members is front channel 22.

At the rear of the frame 18, that is the portion of the frame which is placed against the automobile, there is a rearwardly extending circumferential weatherstrip 24 of a plastic or a rubber material. A sheet of clear transparent material such as plastic, glass plexiglass or the like is secured inside the frame 18 at the rear portion thereof. The frame 18 with the plexiglass 25 and weatherstrip 24 are fastened onto the headlamps such as by screws 26 inserted in holes 27 in the corners of the frame 18 which screws extend into the chrome 15 or other decorative metal surrounding conventional headlamps. When the screws are suitably tightened, the weatherstripping forms a tight seal against the headlamps and an air space 28 is formed between the plexiglass, the frame and the weatherstripping and the headlamps. The front of the plexiglass i.e., that portion away from both the headlamps and the front of the car presents a flat surface which is easily cleanable.

The frame 18 includes a front channel 22 in the top and bottom members 19 and 20 forwardly of the flat transparent member. Positioned within this channel is an inner movable rectangular frame 30 having sides 31 and top and bottom 32, 33. The inner moveable frame 30 is mounted to move in channel 22 on upper and lower rollers or bearings 34. The inner frame 30 is further urged against the channel toward the flat surface by upper and lower front rollers or bearings 35. All of the bearings may be made of rubber or nylon for low friction movement of the inner frame.

On the rear of each side member 31 of the inner frame is a wiper blade 36 such as the kind typically utilized for automobile windshield cleansing.

An actuator means 40 of the present invention is shown in an illustrative embodiment as including a piston 41 pin connected as at 42 to a rod or lever 43 which has a pivot point 44 intermediate its ends. The pivotal motion of rod 43, in response to piston movement, is translated into longitudinal movement by a two rod linkage for each headlamp cleaner including a first rod 46 having its first end pivotally connected as at 47 to the other end of rod 43 and a second rod 48 having its first end pivotally connected as at 49 to the second end of first rod 46. The connection between rods 46 and 48 is adjustable to compensate for automobiles of different widths. Thus rod 46 has a plurality of apertures 56 and rod 48 has a slot 57 for this purpose. The pivotal connection at 49 may be by use of a conventional wing nut.

The second rod 48 has its opposite end connected as at 50 to the inner movable frame 30 of each headlamp cleaner.

In operation, actuation of the piston pivots the rod 43 about pin 44. This pivotal motion is translated into longitudinal movement of the inner frame 30 within the channel 22 by the two rod linkage with the second rod 48 being suitably held in a channel or guideway for longitudinal movement.

The stroke of the piston in a first direction moves the two rod linkage and hence the inner frame a sufficient distance so that each wiper blade 36 brushes across the clear glass 25 corresponding to an area just in excess of one headlamp. Thus, with the two wiper blades as illustrated in FIG. 2, each wiper blade simultaneously cleans the area in front of one headlamp.

Should further cleansing be necessary, the piston is again actuated to this time move the inner frame in the opposite direction across the clear glass 25.

Alternately, a cable may be utilized to actuate the wipers, such as the type of cables used to release the hood of an automobile.

As an additional feature, water may be sprayed on the clear glass 25. The water, which may come from the conventional water supply for windshield washing, is coupled through an upper orifice 55 in the frame to spray a jet of water across a suitable area of the clear glass 25 in front of each headlamp.

The foregoing is a description of the preferred embodiment of the present invention.

It must be appreciated that many modifications can be made without departing from the spirit and scope of the present invention. Changes in the actuating means 40 will be readily appreciated by those skilled in the art. It should be understood, therefore, that the invention should be limited only by the scope of the following claims.

I claim:

1. A headlamp cleaner adapted to be attached to an automobile to provide a flat easily cleanable surface in lieu of cleaning the conventional curved headlamp surface, comprising:
   a flat rectangular support frame having top and bottom frame members and vertical side members;
   said rectangular support frame being mounted entirely exteriorly of said conventional headlamp;
   said support frame having a front channel positionable away from the automobile and a rear portion positionable adjacent the automobile headlamps;
   said front channel being formed in said top and bottom frame members;
   a relatively rigid flat transparent member mounted in said rear portion of said support frame to be spaced away from said headlamp to present a flat, easily cleanable surface;
   a sealing ring on the rear portion of said support frame adapted to form an air tight seal between the frame, the flat transparent member and the headlamp surface to prevent moisture, dust, and so forth from collecting therebetween;
   a flat rectangular wiper frame having top and bottom frame members and vertical side members slideably mounted in the front channel of said support frame for lateral movement within said support frame;
   wiping means mounted on the wiper frame for wiping the front of said flat transparent member; and
   actuator means for reciprocally moving said wiper frame in said front channel of said frame to thereby clean the flat transparent member.

2. The invention as defined in claim 1, said wiper frame mounted on low resistance, low friction rollers, said rollers mounted in the front portion of said frame for biasing the wiper frame toward the transparent rigid member and for facilitating movement of the wiper frame in the front portion of said frame.

3. The invention as defined in claim 1 and further including two wiper blades mounted on said wiper frame in a spaced apart relationship, said wiper frame mounted on low friction rollers and said rollers mounted in the front portion of said frame, each of said wipers simultaneously cleaning a portion of said flat transparent member, each portion corresponding generally to the surface area of a single headlamp.

4. The invention as described in claim 1 and further including an orifice in said support frame for directing a stream of water on said flat surface for increased efficiency in cleaning said flat surface.

5. The invention as defined in claim 1 wherein said actuator means includes:
   a lever,
   a piston connected to one end of said lever for pivoting the lever, and
   a two-rod linkage, connected to said lever and said wiper frame;
   said two rod linkage for translating pivotal movement of said lever into lateral movement of said wiper frame.

* * * * *